United States Patent
Ahn et al.

(10) Patent No.: US 8,532,723 B2
(45) Date of Patent: Sep. 10, 2013

(54) PORTABLE COMMUNICATION DEVICE AND SLIDE-TYPE CRADLING APPARATUS THEREOF

(75) Inventors: Sung-Ho Ahn, Seoul (KR); Sang-Joon Park, Seoul (KR); Sang-Min Hyun, Seoul (KR); Han-Gil Song, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 463 days.

(21) Appl. No.: 12/692,723

(22) Filed: Jan. 25, 2010

(65) Prior Publication Data
US 2010/0210311 A1    Aug. 19, 2010

(30) Foreign Application Priority Data
Feb. 18, 2009    (KR) .................. 10-2009-0013439

(51) Int. Cl.
*H04M 1/38*    (2006.01)
(52) U.S. Cl.
USPC ....................... 455/575.4; 455/566
(58) Field of Classification Search
USPC .................... 455/566, 575.3, 575.4
See application file for complete search history.

(56) References Cited

U.S. PATENT DOCUMENTS

| | | | |
|---|---|---|---|
| 6,643,124 B1* | 11/2003 | Wilk | 361/679.04 |
| 2005/0011049 A1* | 1/2005 | Muir | 16/366 |
| 2006/0139862 A1* | 6/2006 | Wang et al. | 361/681 |
| 2009/0286574 A1* | 11/2009 | Kim et al. | 455/566 |
| 2010/0188350 A1* | 7/2010 | Sawada | 345/173 |
| 2011/0263304 A1* | 10/2011 | Laido et al. | 455/575.3 |

FOREIGN PATENT DOCUMENTS
KR    10-0678215    1/2007

* cited by examiner

*Primary Examiner* — Vladimir Magloire
(74) *Attorney, Agent, or Firm* — Cha & Reiter, LLC

(57) ABSTRACT

A portable communication device that cradles a first and a second display units at a same angle, and a slide-type cradling apparatus thereof are disclosed. The portable communication device includes: a first housing; a second housing including a first display unit and facing the first housing when being slid and cradled at a known incline angle; and a third housing including a second display unit, and being introduced into the first housing before the second housing is slid and being withdrawn from the first housing after the second housing is slid such that the second housing is inclined and the third housing is inclined in an extension direction of the second housing.

19 Claims, 12 Drawing Sheets

PORTABLE COMMUNICATION DEVICE AND SLIDE-TYPE CRADLING APPARATUS THEREOF

CLAIM OF PRIORITY

This application claims the benefit of an earlier application entitled "Portable Communication Device And Slide-Type Cradling Apparatus Thereof", filed in the Korean Intellectual Property Office on Feb. 18, 2009 and assigned Serial No. 10-2009-0013439, the contents of which are incorporated by reference, herein.

BACKGROUND OF THE INVENTION

1. Field of the Invention

The present invention relates to a portable communication device and more particularly to a communication device that includes an apparatus that enables the sliding of a first and second display unit such that the second display unit is positioned at a same angle of the first display unit so as to form an extended display.

2. Description of the Related Art

In general, a "portable communication device" refers to a device that can perform wireless communication with a counterpart while the user is carrying it. Such portable communication devices include a hand-held phone (HHP), a CT-2 terminal, a cellular phone, a digital phone, a personal communications service (PCS) phone, and a personal digital assistant (PDA), and are classified into various types according to their outer appearances. For example, portable communication devices or wireless terminals are classified into a bar-type wireless terminal, a flip-type wireless terminal, a folder-type wireless terminal, and a slide-type wireless terminal. The above-described existing portable communication devices essentially include an antenna unit, a data input/output unit, and a data transmitting/receiving unit. Here, the data input/output unit generally is a keypad that is pressed mainly by a finger to input data.

A slide-type wireless terminal includes a main body having a keypad, a slide body having a display unit, and a slide module that slides the slide body from the main body.

However, the existing slide-type wireless terminal has the following problems. A separate cradle is used for the user to conveniently see information displayed on a display unit, causing an uneconomical problem to the user. It is known that the user substantially needs to face a display unit that is inclined to conveniently see the information displayed on a display unit. However, conventionally, without a separate cradle, the user needs to face the wireless terminal with its body being held in a hand of the user at an angle (i.e., an included position), and it is actually inconvenient for the user to see a screen displayed on the display unit of a wireless terminal held on a table or the like without a separate cradle.

In order to solve the above-described problems, Korean Patent No. 10-0678215 discloses a portable terminal and a slide-type cradling apparatus in detail.

As illustrated in FIGS. 1 and 2, the slide-type cradling apparatus 10 of a portable communication device includes a first housing 20 having a plurality of keys 21, a second housing 30 having a display unit 31 and being cradled on the first housing 20 at an inclined angle after being slid from the first housing 20 (see FIG. 2), a first member 50 provided in the first housing 20, a second member 60 coupled to the second housing 30, a slide guide unit 70 provided between the first and second members 50 and 60 to guide the position of the second housing 30, and a hinge unit 80 provided in the first member 50 and the slide guide unit 70 to rotate the slide guide unit 70 about a hinge shaft A1.

However, since the existing slide-type cradling apparatus of a portable communication device has a structure in which the second housing is slid and then inclinedly cradled to provide access to the keys of the first housing, the installation space for the keys is restricted. Moreover, since the display unit is provided in the second housing, a large-sized display unit cannot be used.

As illustrated in FIG. 1, since the existing hinge unit has a hinge arm, a rod, a cam, and a coil spring, spaces for these parts are necessary, and the large number of parts results in an increase in manufacturing costs and the number of assembling processes.

Therefore, there is a need for an apparatus that can make a large-size display unit, use a wide keypad, miniaturize a product by reducing the number of parts, and reduce manufacturing costs and the number of assembling processes.

SUMMARY OF THE INVENTION

The present invention discloses a portable communication device that can slide and cradle a display unit and extend and cradle another display unit at a same angle so that the display units constitutes one large-sized screen and the large-sized screen is used as a keypad.

The present invention also provides a portable communication device that can slide and cradle a display unit at a first angle and extend and cradle another display unit at the same angle so that a large-sized screen is created, a portion of which may be used as a touch screen.

The present invention also provides a portable communication device including a slide-type cradling apparatus that can be miniaturized by utilizing an inner space of a housing while reducing manufacturing costs, through a reduction in the number of assembling processes caused by reducing the number of parts using a slide-type cradling apparatus that extends a display unit introduced and withdrawn into and from the housing and inclinedly cradled at a same angle at one end of the housing.

In accordance with an aspect of the present invention, there is provided a portable communication device including: a first housing; a second housing including a first display unit and facing the first housing when being slid and inclinedly cradled; and a third housing including a second display unit, and being introduced into the first housing before the second housing is slid and being withdrawn from the first housing after the second housing is slid such that the second housing is inclinedly cradled and the third housing is inclinedly cradled in an extension direction of the second housing.

In accordance with an aspect of the present invention, there is provided a slide-type cradling apparatus of a portable communication device which includes a first housing, a second housing including a first display unit and facing the first housing when being slid and cradled at an angle, and a third housing including a second display unit, and being introduced into the first housing before the second housing is slid and being withdrawn from the first housing after the second housing is slid such that the second housing is cradled at an angle and the third housing is inclined cradled in an extension direction of the second housing, the slide-type cradling apparatus including: a movable plate coupled to the second housing; a first rotary link unit provided at one end of the movable plate to slidably couple the movable plate and inclinedly rotate the movable plate about a first link axis after the movable plate is slid; a second rotary link unit rotatably coupled to the first rotary link unit and rotated about a second link axis when the first rotary link unit is inclinedly rotated; and a third rotary link unit coupled to the third housing, rotatably coupled to the first housing and the second rotary link unit, and rotated to introduce or withdraw the third housing into or from the first housing when the second rotary link unit is rotated.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE INVENTION

Figure 1:
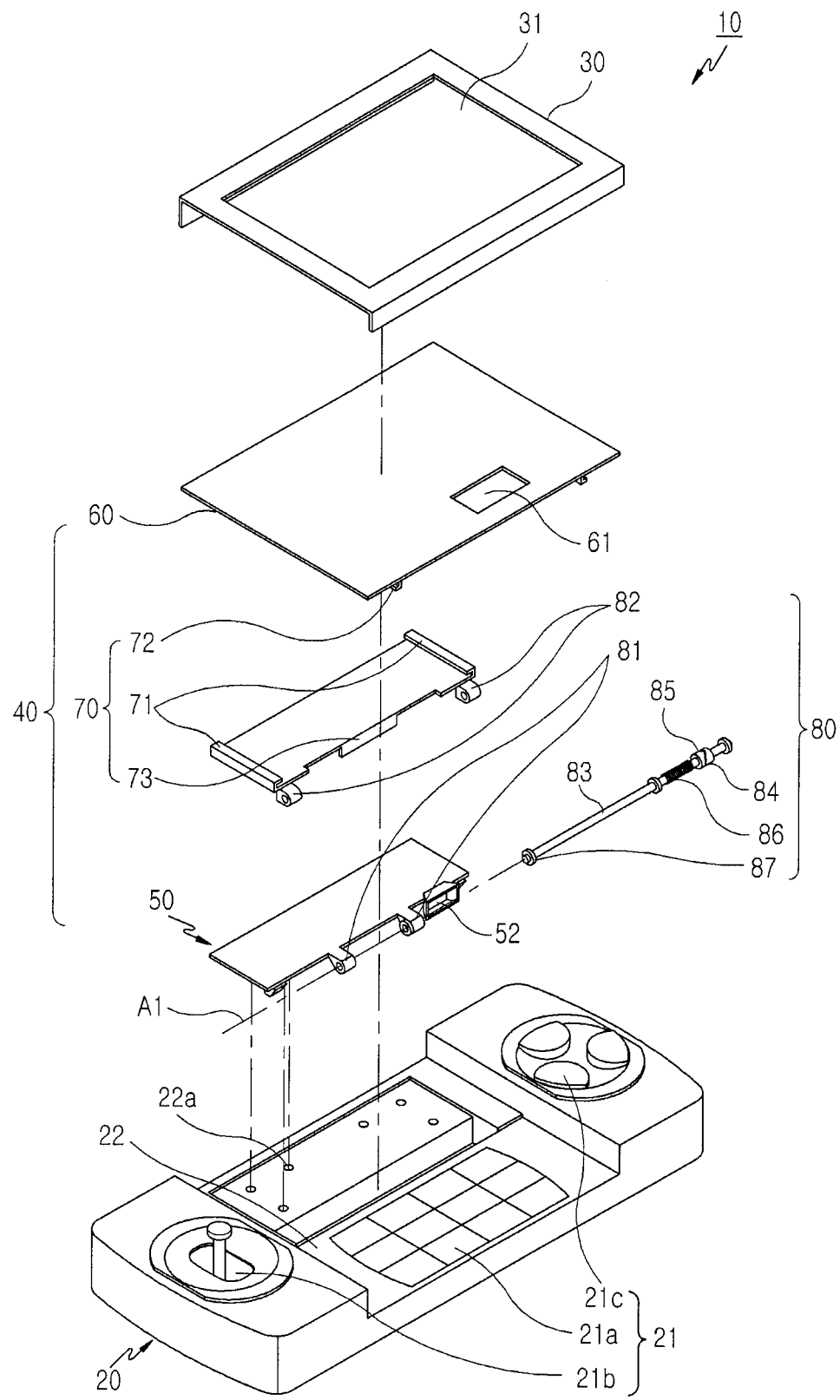
FIG. 1 is an exploded perspective view illustrating an existing slide-type cradling apparatus of a portable communication device.
Figure 2:
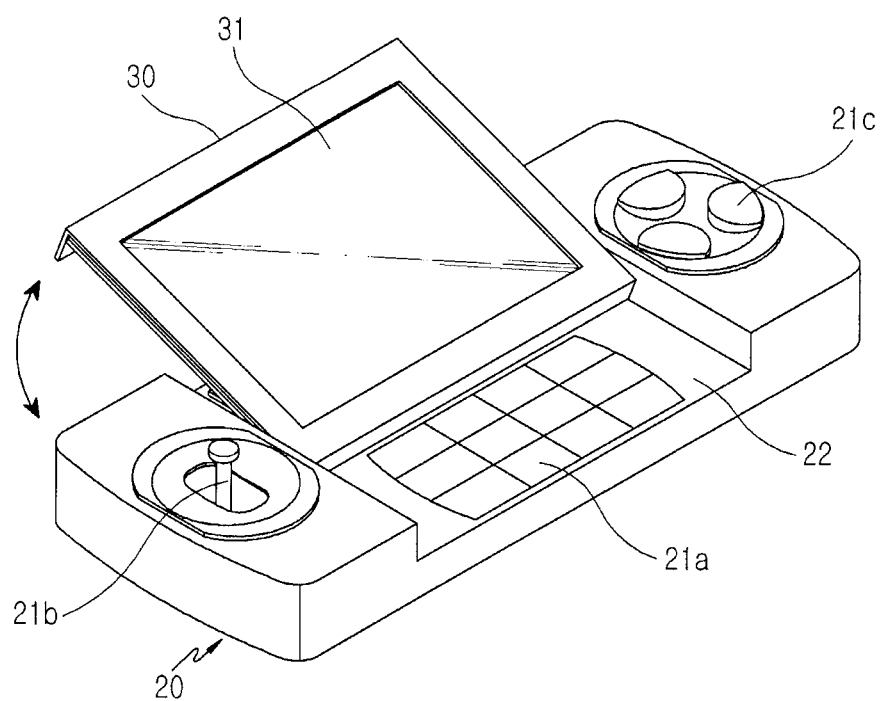
FIG. 2 is a perspective view illustrating an operation of the slide-type cradling apparatus of FIG. 1.

An exemplary embodiment of the present invention is described with reference to the accompanying drawings. It should be understood that since the embodiment of the present invention described in the specification and the configurations illustrated in the drawings represent merely one of the most exemplary embodiments of the present invention and does not contain all technical spirits of the present invention, there may be various modifications that can replace them at the time of the present application.

As illustrated in FIGS. 3 to 13, a slide-type cradling apparatus 200 of a portable communication device 100 includes first, second, and third housings 110, 120, and 130, a movable plate 210, and first, second, and third rotary link units 220, 230, and 240. The first housing 110 faces the second housing 120, which is slid and inclinedly cradled with respect to the first housing 110 and the third housing 130, which can be embedded in the first housing 110 and be introduced and withdrawn into and from the first housing 110. The second housing 120 includes a first display unit 121 and is provided on the top surface of the first housing 110 so that it can be slid and inclinedly cradled while facing the first housing 110. The third housing 130 includes a second display unit 131 and is provided in the first housing 110 so that it is introduced into the first housing 110 before the second housing 120 is slid and is withdrawn from the first housing 110 such that the second housing 120 is slid and inclinedly cradled and the third housing 130 is inclinedly cradled as the second housing 120 extends. An introduction/withdrawal space 111 for embedding and introducing/withdrawing the third housing 130 is formed in the first housing 110.

As illustrated in FIGS. 7 to 13, the third housing 130 has a keypad (not shown) in which a plurality of keys are arranged. The first and second display units 121 and 131 (see FIG. 9) are arranged in parallel to each other at the same angle to make the viewable area to comprise the combination of display units 121 and 131 when the second and third housings 121 and 131 are extended. The third housing 130 extends below the second housing 120 and is inclined at the same angle as that of the second housing 120 (see FIG. 11).

As illustrated in FIGS. 3 to 6, the movable plate 210 is coupled to the second housing 120 such that it is slidably coupled to a first rotary link unit 220. The first rotary link unit 220 is provided at one end of the movable plate 210 such that the movable plate 210 is slid and then rotated about the first link axis A1 to achieve a desired inclined angle with respect to the first housing. The second rotary link unit 230 is rotatably coupled to the first rotary link unit 220 such that it is rotated about the second link axis A2 when the first rotary link unit 220 is rotated. The third rotary link unit 240 is rotatably coupled to the first housing 110 and the second rotary link unit 230 is coupled to the third housing 130 such that the second rotary link unit 230 is rotated about the third link axis A3 to introduce or withdraw the third housing 130 into and from the first housing 110 when the second rotary link unit 230 is rotated.

As illustrated in FIGS. 3 to 13, the first rotary link unit 220 (FIG. 3) is rotatably coupled to the first housing 110, and a stopper pin 270 (FIG. 3) passing through a link stopper hole 224 of the first rotary link unit 220 passes through the first housing 110 and supports the first rotary link unit 220 such that the rotation of the first rotary link unit 220 is limited. A hinge stopper unit 250 provides a click feeling when the first rotary link unit 220 is rotated and achieves a desired inclined angle with respect of the first housing 110. The hinge stopper unit 250 includes a screw coupler 251, a hinge hole 252, a stopper hole 253, and at least one click recess 254. The screw coupler 251 is screw-coupled to the first housing 110 to support the hinge stopper unit 250 and the first rotary link unit 220. The hinge hole 252 is formed adjacent to the screw coupler 251 such that the hinge pin 260 passes through the link hinge hole 223 of the first rotary link unit 220 so that the first rotary link unit 220 can be rotated. The stopper hole 253 is formed adjacent to the hinge hole 252 such that the stopper pin 270 passes through it. The click recess 254 is adapted to engage or detach from a detachable ball 280 provided in the first rotary link unit 220 and provides a click feeling to the first rotary link unit 220 as the first rotary link unit 220 is rotated.

As illustrated in FIGS. 3 to 6, the first rotary link unit 220 includes a guide mover 221, a rotary boss 222, a link hinge hole 223, and a link stopper hole 224. The guide mover 221 is coupled to one end of the movable plate 210 such that the movable plate 210 can be slid. The rotary boss 222 is formed at one end of the first rotary link unit 220 so as to be rotatably coupled to the second rotary link unit 230. The link hinge hole 223 provides the first link axis A1 and is formed adjacent to the guide mover 221 such that the hinge pin 260 passes through it. The stopper pin 270 passes through the link stopper hole 224, and the link stopper hole 224 is formed adjacent to the link hinge hole 223 such that the rotation of the first rotary link unit 220 can be limited.

As illustrated in FIGS. 3 to 6, the ball recess 225 (FIG. 4) for accommodating the detachable ball 280 and the coil spring 281 is formed adjacent to the link stopper hole 224.

Figure 3:
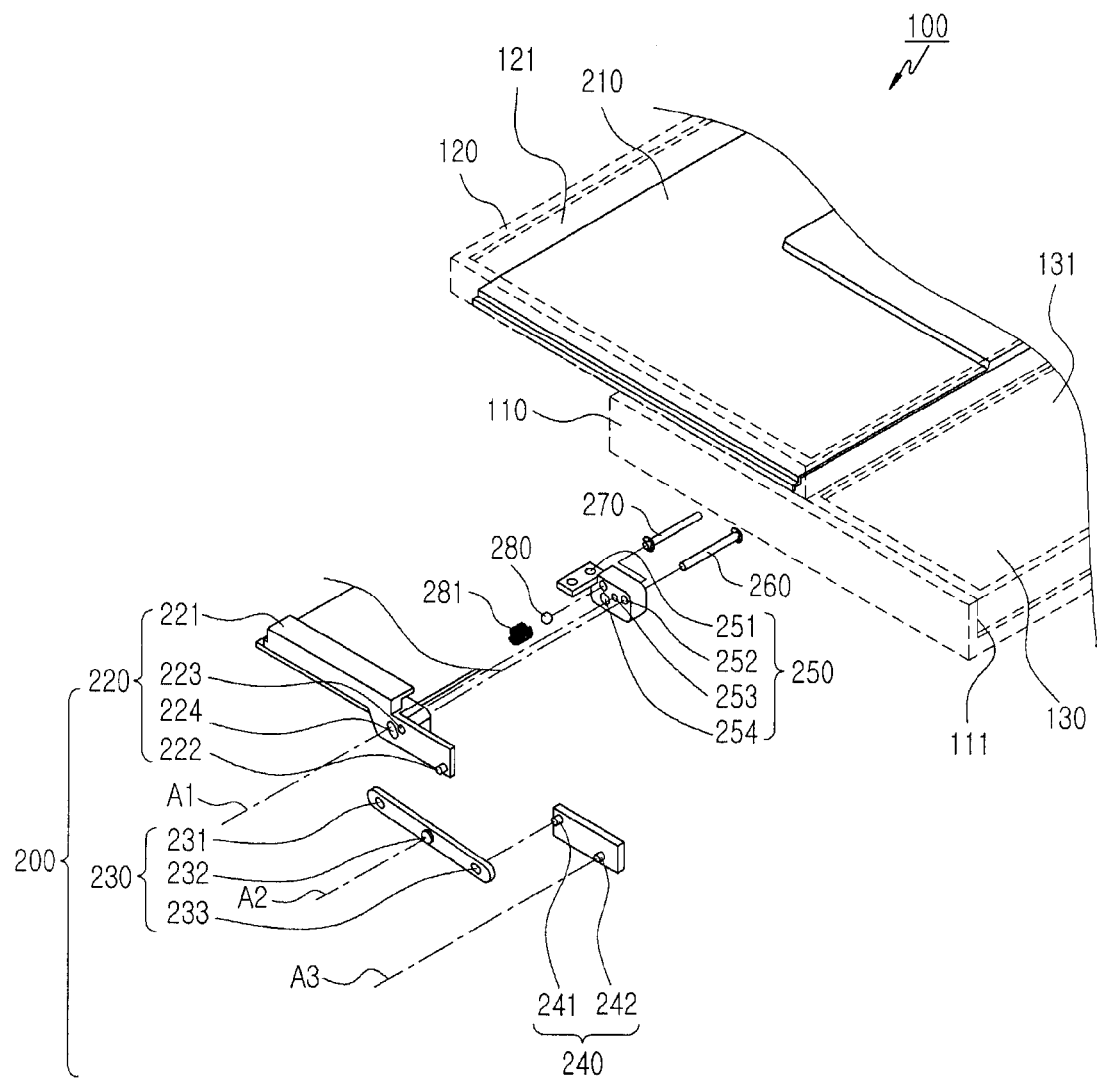
FIG. 3 is an exploded perspective view illustrating a slide-type cradling apparatus of a portable communication device according to an embodiment of the present invention.

As illustrated in FIG. 3, a first link hole 231 rotatably coupled to the rotary boss 222 formed in the first rotary link unit 220 is formed at one end of the second rotary link unit 230. The second link axis A2 is formed at a central portion of the second rotary link unit 230. The link support 232 supports the second rotary link unit 230 such that the second rotary link unit 230 can be rotated and balanced about the second link axis A2. A second link hole 233 rotatably coupled to a link rotating boss 241 formed in the third rotary link unit 240 is formed at the opposite end of the second rotary link unit 230.

As illustrated in FIG. 3, the third rotary link unit 240 includes a link rotating boss 241 and a rotation supporting boss 242. The link rotating boss 241 is formed at one end of the third rotary link unit 240 such that it is rotatably coupled to the second link hole 233 of the second rotary link unit 230. The rotation supporting boss 242 provides the third link axis A3 and is rotatably coupled to the first housing 110 to support the rotation of the third rotary link unit 240.

Hereinafter, the operation of the slide-type cradling apparatus of a portable communication device according to the embodiment of the present invention will be described in detail with reference to FIGS. 3 to 13.

As illustrated in FIGS. 3 to 6, the slide-type cradling apparatus of a portable communication device 100 includes the first, second, and third housings 110, 120, and 130, the movable plate 210, the first, second, and third rotary link units 220, 230, and 240, and the hinge stopper unit 250. The movable plate 210 is coupled to the second housing 120, and the hinge stopper unit 250 is coupled to the first housing 110. Then, since the hinge stopper unit 250 has the screw coupler 251, it is coupled to the first housing 110 using the screw coupler 251.

In this state, as illustrated in FIGS. 3 to 6, the guide mover 221 formed in the first rotary link unit 220 is coupled to one end of the movable plate 210 so that the movable plate 210 can be slid. At the same time, the link hinge hole 223 and the link stopper hole 224 of the first rotary link unit 220 are aligned with the link hinge hole 252 and the link stopper hole 253 of the hinge stopper unit 250. The hinge pin 260 passes through the aligned link hinge hole 223 and hinge hole 252, and the stopper pin 270 passes through the aligned link stopper hole 224 and stopper hole 253.

Figure 4:
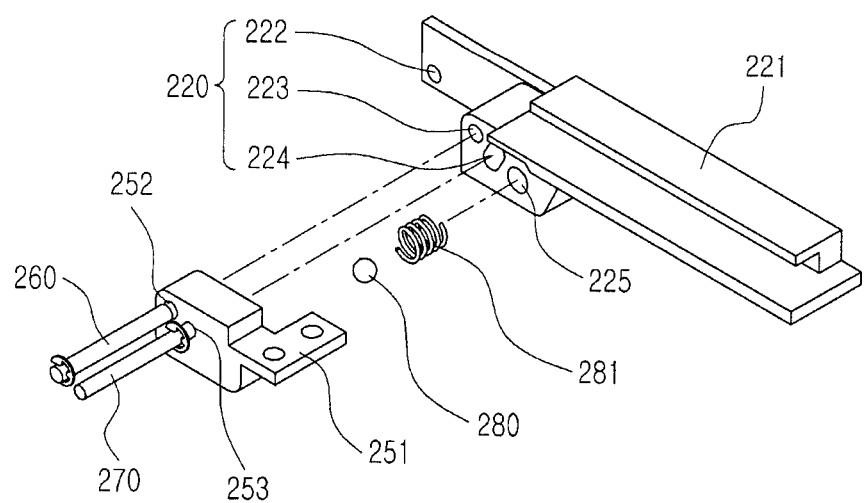
FIG. 4 is an enlarged exploded perspective view illustrating a first rotary link unit and a hinge stopper unit of the slide-type cradling apparatus of a portable communication device according to the embodiment of the present invention.
Figure 5:
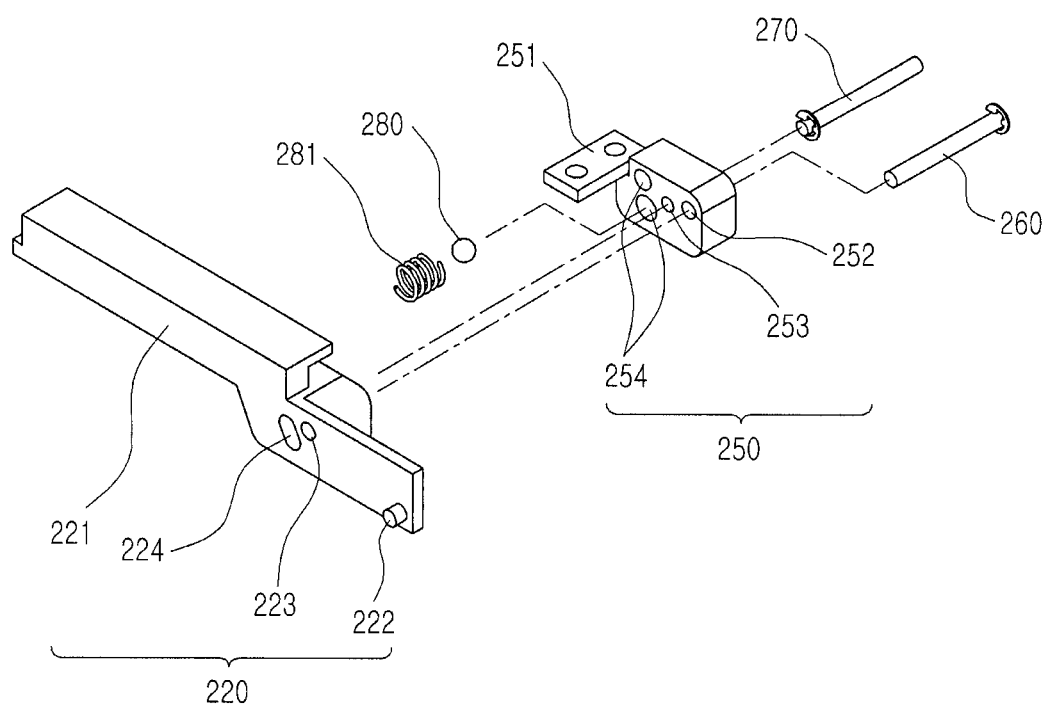
FIG. 5 is an enlarged exploded perspective view illustrating the first rotary link unit and the hinge stopper unit of the slide-type cradling apparatus of a portable communication device according to the embodiment of the present invention.
Figure 6:
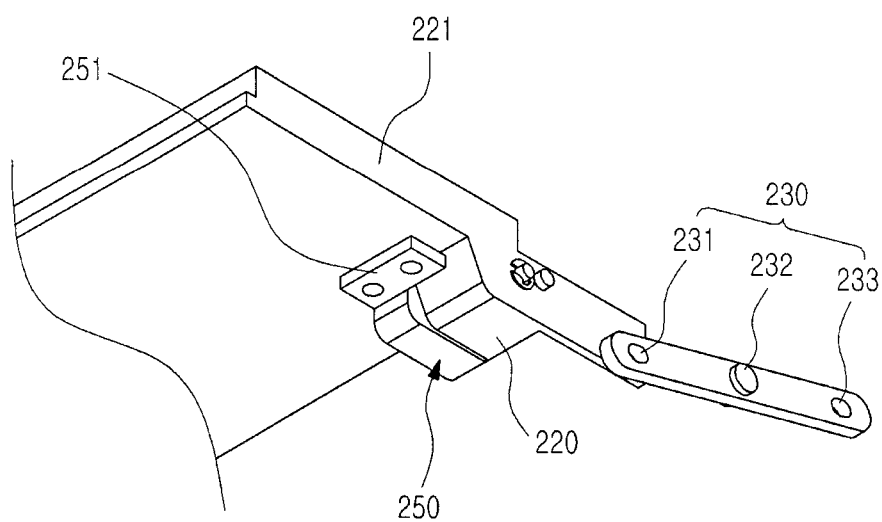
FIG. 6 is a perspective view illustrating an assembled state of the slide-type cradling apparatus of a portable communication device according to the embodiment of the present invention.

Then, as illustrated in FIGS. 4 to 6, since the ball recess 225 for accommodating the detachable ball 280 and the coil spring 281 is formed adjacent to the link stopper hole 253, the coil spring 281 and the detachable ball 280 are accommodated in the ball recess 225 and the detachable ball 280 is then inserted into the click recess 254 formed in the hinge stopper unit 250.

In this state, the rotary boss 222 formed in the first rotary link unit 220 is rotatably coupled to the first link hole 231 of the second rotary link unit 230, and the link rotating boss 241 formed in the third rotary link unit 240 is rotatably coupled to the second link hole 233 of the second rotary link unit 230.

The link support 232 formed at a central portion of the second rotary link unit 230 is coupled to the first housing 110 such that it can be rotated about this point. The third rotary link unit 240 is coupled to the third housing 130.

As illustrated in FIGS. 3 to 8, the second housing 120 is slidably coupled to the first housing 110 while it is facing the top surface of the first housing 110, and the third housing 130 is coupled to the first housing 110 such that it can be introduced into and withdrawn from the introduction/withdrawal space 111 formed in the first housing 110.

Figure 9:
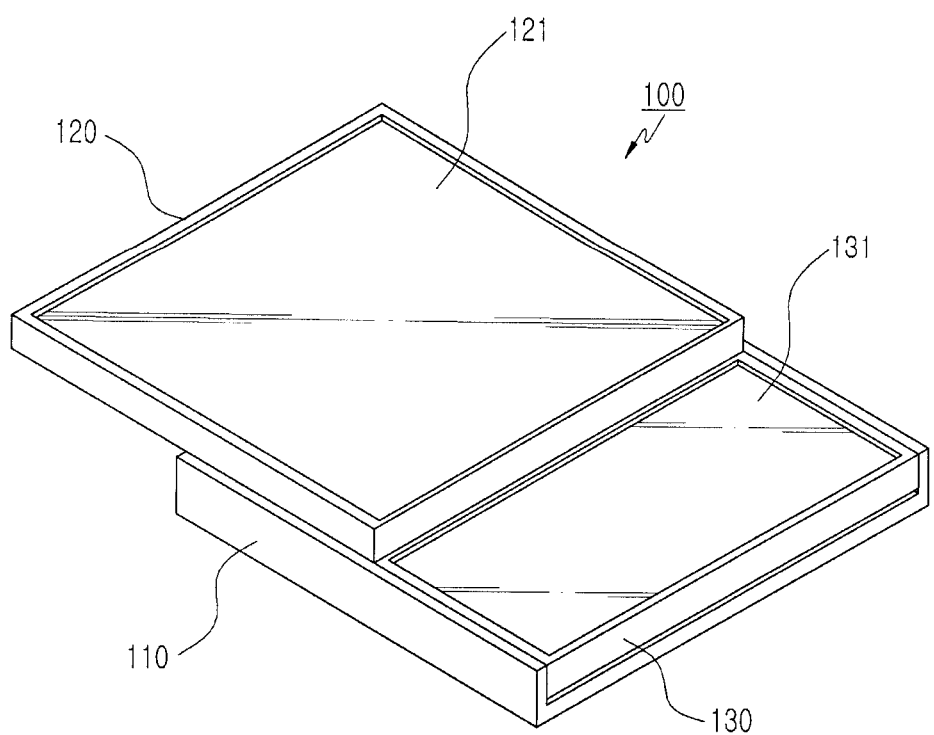
FIG. 9 is a perspective view illustrating a slide movement of the slide-type cradling apparatus of a portable communication device according to the embodiment of the present invention.
Figure 10:
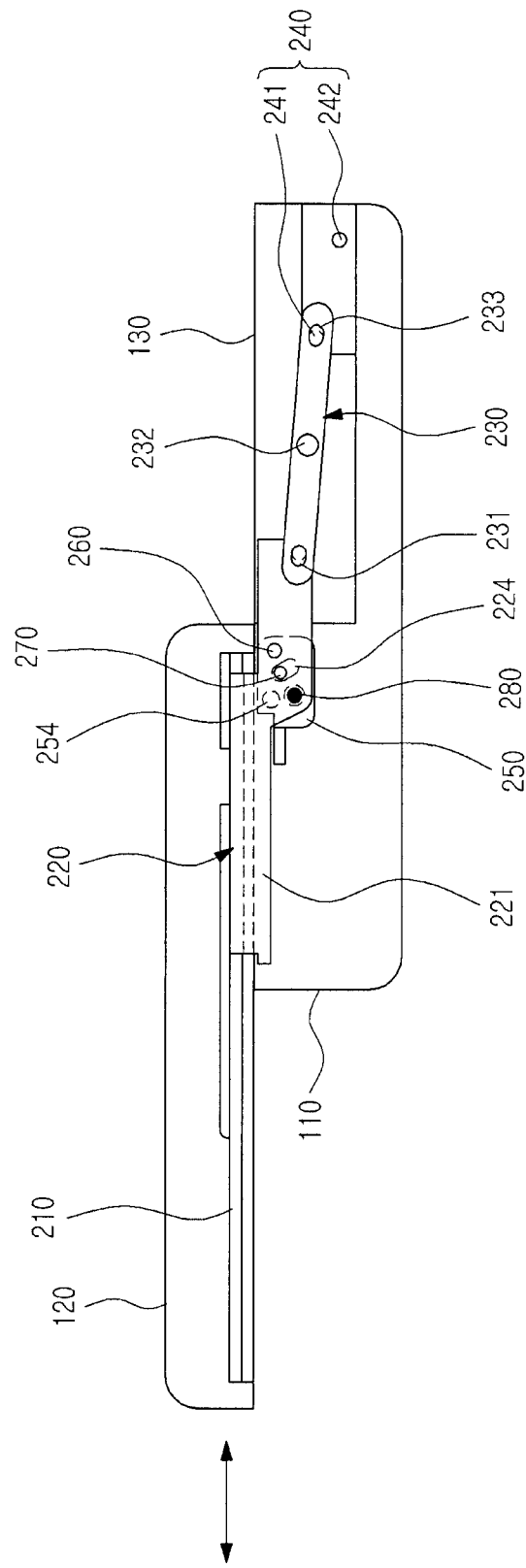
FIG. 10 is a side view illustrating a slide movement of the slide-type cradling apparatus of a portable communication device according to the embodiment of the present invention.

In this state, as illustrated in FIGS. 9 and 10, the second housing 120 is slid from the first housing 110. Then, the movable plate 210 coupled to the second housing 120 is also slid by the guide mover 221 of the first rotary link unit 220.

Figure 11:
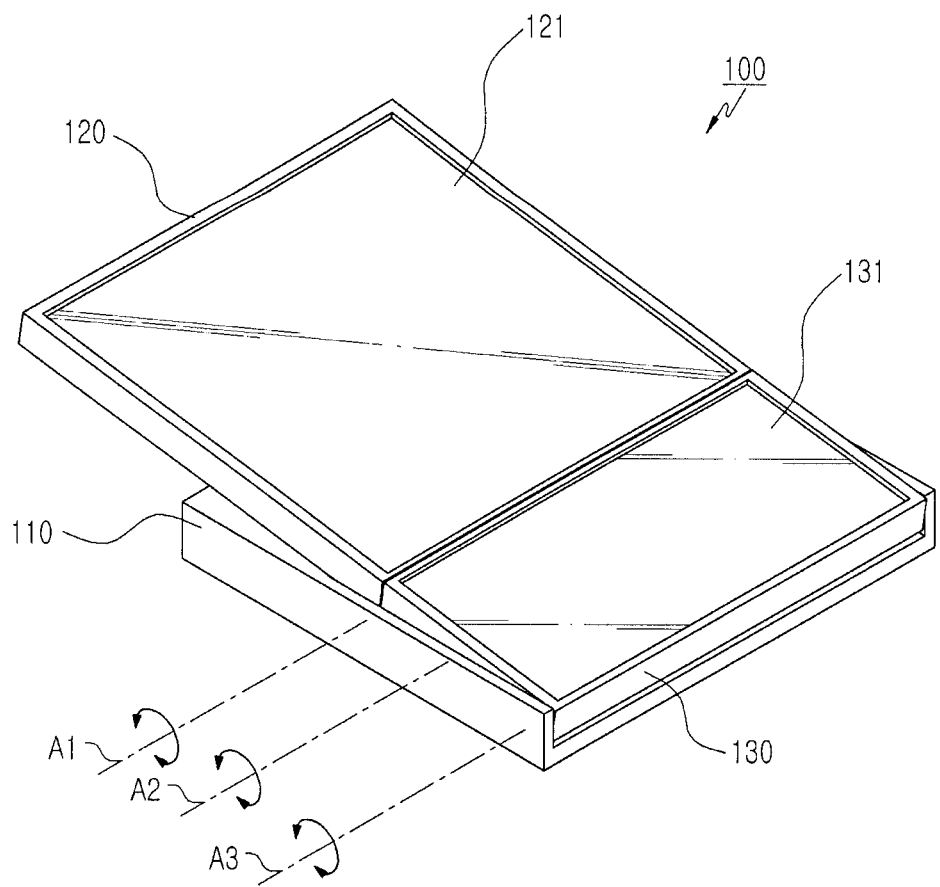
FIG. 11 is a perspective view illustrating a cradled state of a portable communication device after the slide-type cradling apparatus according to the embodiment of the present invention is operated.
Figure 13:
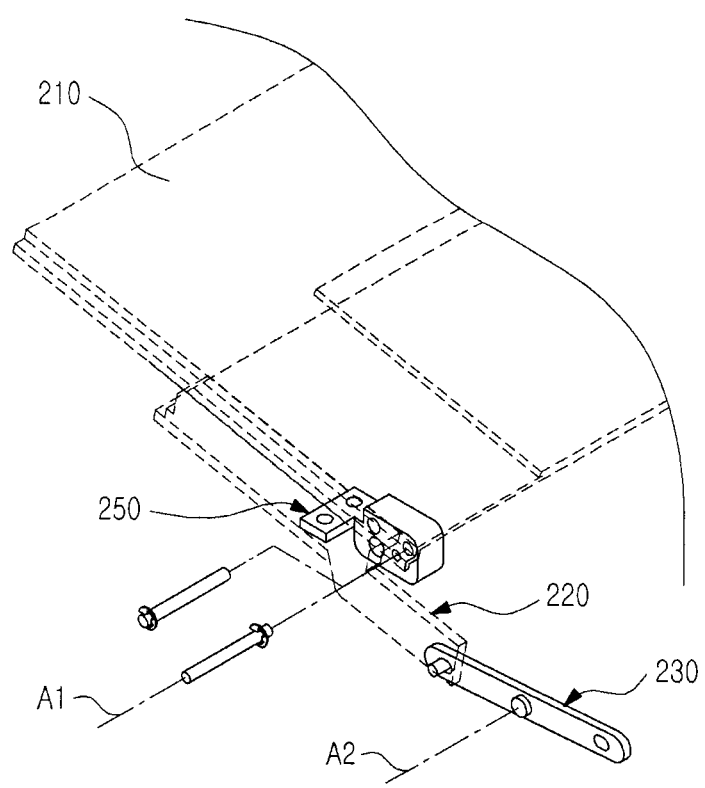
FIG. 13 is an enlarged perspective view illustrating a cradled state of a portable communication device after the slide-type cradling apparatus according to the embodiment of the present invention is operated.

Here, as illustrated in FIGS. 11 and 13, when the second housing 120 is lifted from the first housing 110 to be inclinedly cradled, the movable plate 210 is inclinedly rotated together with the first rotary link unit 220.

Figure 12:
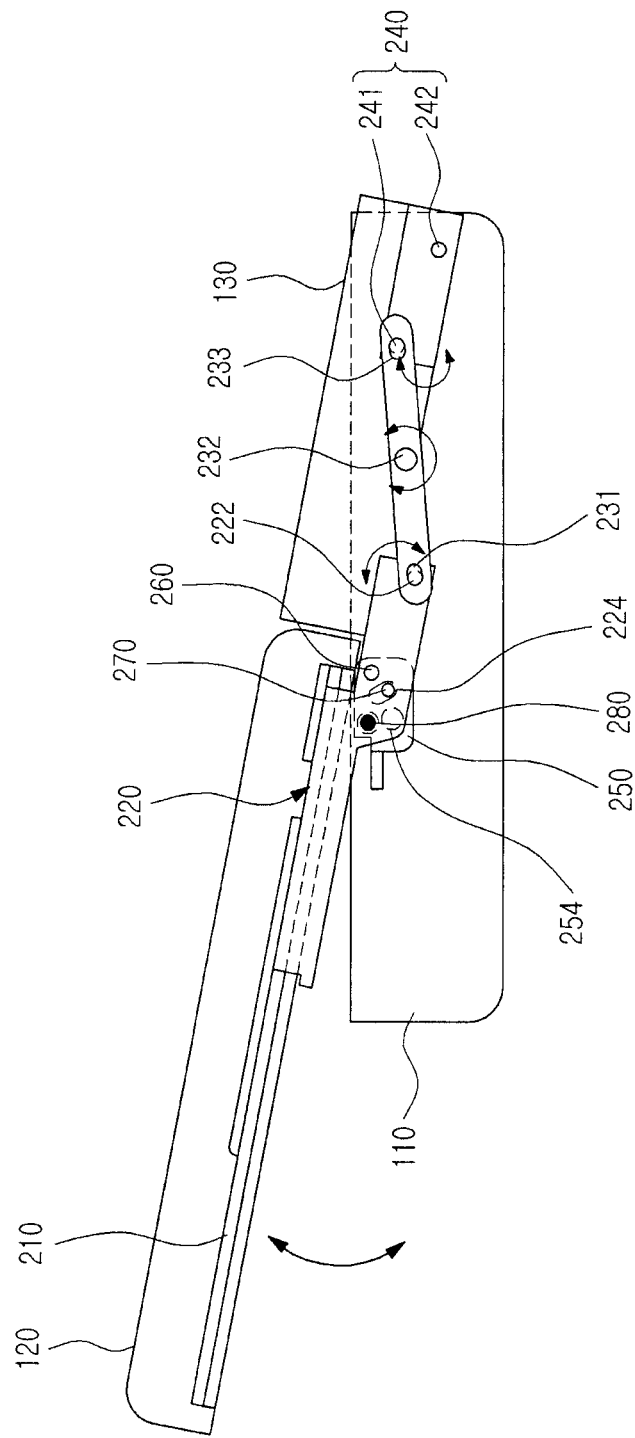
FIG. 12 is a side view illustrating a cradled state of a portable communication device after the slide-type cradling apparatus according to the embodiment of the present invention is operated.

As illustrated in FIGS. 11-13, the first rotary link unit 220 is rotated about the first link axis A1 by the hinge pin 260 and then the link stopper hole 224 of the first rotary link unit 220 is rotated together. The rotation of the first rotary link unit 220 is limited by the stopper pin 270 provided in the link stopper hole 224. Then, the detachable ball 280 provided in the first rotary link unit 220 is separated from a first click recess 254 formed in the hinge stopper unit 250 and is inserted into a second click recess 254 to provide a click feeling.

As illustrated in FIG. 12, when the first rotary link unit 220 is rotated about the first link axis A1 (see FIG. 11), the guide mover 221 is lifted and the rotary boss 222 of the first rotary link unit 220 is rotated and lowered. Then, the first link hole 231 formed at one end of the second rotary link unit 230 rotatably coupled to the rotary boss 222 is also lowered.

As illustrated in FIG. 12, the opposite end of the second rotary link unit 230 is lifted as the front end is lowered. The link support 232 formed at a central portion of the second rotary link unit 230 is rotated about the second link axis A2 (see FIG. 11) to lift the second link hole 233 formed at the opposite end of the second rotary link unit 230. Since the second link hole 233 is rotatably coupled to the link rotating boss 241 formed in the third rotary link unit 240, the third rotary link unit 240 is also lifted by the link rotating boss 241 as the second link hole 233 is lifted.

As described above, the second rotary link unit 230 is balanced about the second link axis A2, and if one side of the second rotary link unit 230 is lowered, the opposite side thereof is lifted.

As illustrated in FIG. 12, the rotation supporting boss 242 of the third rotary link unit 240 is rotated about the third link axis A3 (see FIG. 13), and if the rotation supporting boss 242 is rotated, the third rotary link unit 240 and the third housing 130 are rotated together.

As illustrated in FIG. 11, the third housing 130 is rotated and withdrawn from the introduction/withdrawal space 111 (not shown) of the first housing 110 at the same time, and then is cradled in a direction in parallel to the second housing 120. Thus, the second housing 120 is slid and cradled and the third housing 130 is rotated together to be inclined at the same angle as the inclined angle of the second housing 120.

As illustrated in FIG. 11, the first display unit 121 provided in the second housing 120 and the second display unit 131 of the third housing 130 are arranged in parallel at a same inclined angle such that the first and second display units 121 and 131 can be used as one large-sized screen. In one aspect of the invention the large-sized screen may be used, for example, as a single display, or as a display and a keypad or as a touch screen and a keypad (not shown).

As illustrated in FIGS. 9 and 10, the second housing 120 is lowered toward the first housing 110 to face the first housing 110, and then the movable plate 210 is also lowered.

As illustrated in FIG. 10, the stopper pin 270 limits rotation due to the stopper hole 224 of the first rotary link unit 220, and the detachable ball 280 is rotated to be separated from a first click recess 254 and is inserted into a second click recess 254 to provide a click feeling. Then, the first rotary link unit 220 is rotated about the first link axis A1 and is lowered along the guide mover 221 of the first rotary link unit 220 and then the rotary boss 222 of the first rotary link unit 220 is lifted.

As illustrated in FIG. 10, the rotary boss 222 lifts the first link hole 231 at one end of the second rotary link unit 230 and the link support 232 of the second rotary link unit 230 is rotated and balanced (hinged) about the second link axis A2 to lower the second link hole 233 formed at the opposite end of the second rotary link unit 230. If the second link hole 233 is lowered, the link rotating boss 241 of the third rotary link unit 240 and the third rotary link unit 240 are lowered together. Then, the rotation supporting boss 242 of the third rotary link unit 240 is rotated about the third link axis A3, and the third rotary link unit 240 is lowered and the third housing 130 is introduced into the introduction/withdrawal space 111 of the first housing 110 at the same time.

Figure 7:
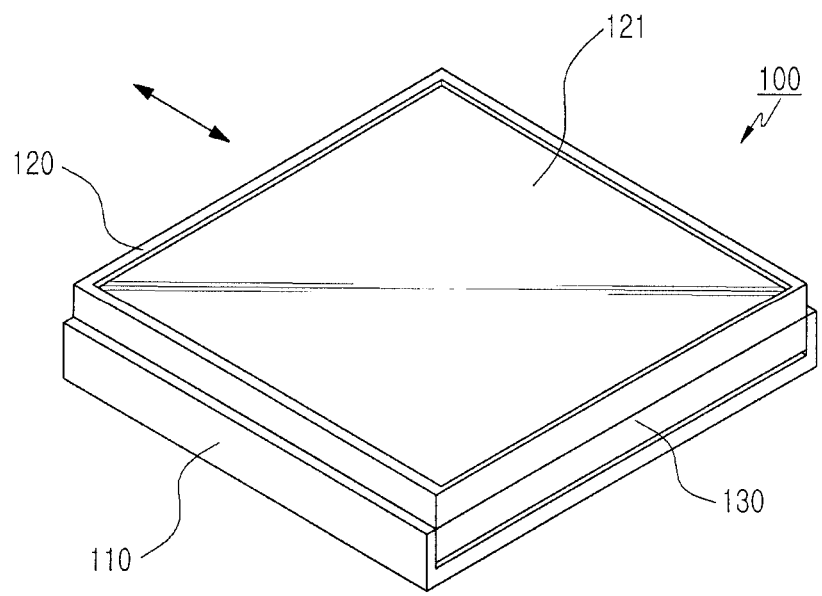
FIG. 7 is a perspective view illustrating an initial state of a portable communication device before the slide-type cradling apparatus according to the embodiment of the present invention is operated.
Figure 8:
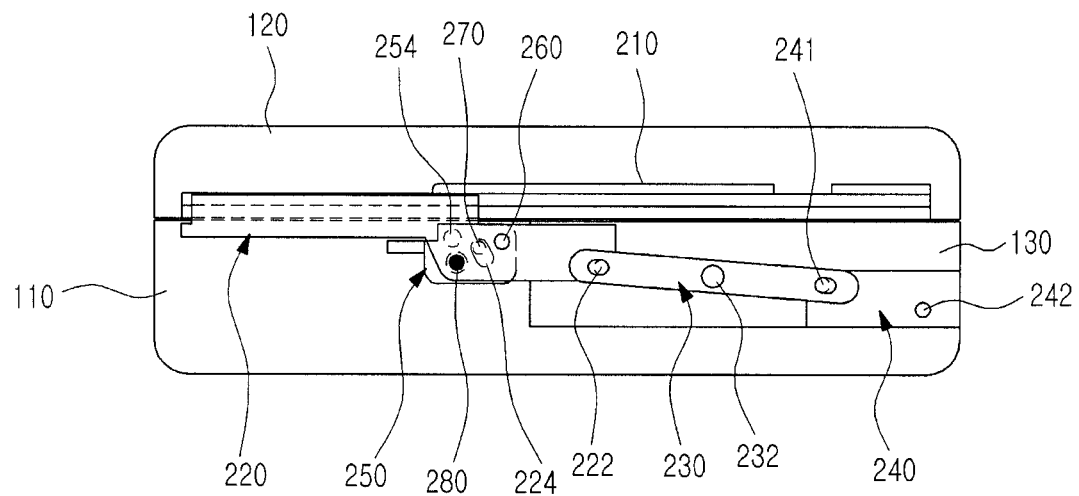
FIG. 8 is a side view illustrating the initial state of a portable communication device before the slide-type cradling apparatus according to the embodiment of the present invention is operated.

As illustrated in FIGS. 7 and 8, the second housing 120 is slid again and is moved to the original position, facing the first and third housings 110 and 130.

While the portable communication device and the slide-type cradling apparatus thereof according to the invention have been shown and described with reference to a certain exemplary embodiment thereof, it will be understood by those skilled in the art that various changes in form and details may be made therein without departing from the spirit and scope of the invention as defined by the appended claims.

What is claimed is:

1. A portable communication device comprising:
a first housing;
a second housing including a first display unit and facing the first housing when being slid with respect to said first housing and cradled at a known incline angle with respect to said first housing;
a third housing including a second display unit, and being introduced into the first housing before the second housing is slid with respect to said first housing and being withdrawn from the first housing after the second housing is slid with respect to said first housing such that the second housing is inclinedly cradled and the third housing is inclined in an extension direction vertically at the known incline angle of the second housing so that the first and second display units are aligned to form a single large sized screen and
a sliding means including:
a sliding device for slidably coupling the first and second housings;
a hinge device engaging the sliding device at one end thereof;
a rotatable link engaging the hinge device at the other end of the hinge device; and
a hinge stopper unit rotatably engaging with the sliding device, the hinge stopper unit coupled to a stopper pin passing through a stopper hole of the rotary link unit for limiting a rotation of the rotary link so that the aligned first and second display units are maintained at the known incline angle.

2. The portable communication device according to claim 1, wherein an introduction/withdrawal space for introducing and withdrawing the third housing is formed in the first housing.

3. The portable communication device according to claim 1, wherein a keypad in which a plurality of keys are arranged is provided in the third housing.

4. The portable communication device according to claim 1, wherein the first and second display units are arranged in parallel to each other at a same inclined angle to achieve a large-sized screen when the second and third housings are cradled and the large-sized screen presented is part of one of a display, a touch screen and a keypad.

5. The portable communication device according to claim 1, wherein the third housing extends below the second housing and is inclined at a same angle as that of the second housing.

6. A slide-type cradling apparatus of a portable communication device which comprises:
a first housing,
a second housing including a first display unit and facing the first housing when being slid and inclinedly cradled, and
a third housing including a second display unit, and being introduced into the first housing before the second housing is slid and being withdrawn from the first housing after the second housing is slid such that the second housing is cradled at a known angle and the third housing is inclined in an extension direction of the second housing, the slide-type cradling apparatus comprising:
a movable plate coupled to the second housing;
a first rotary link unit provided at one end of the movable plate to slidably couple the movable plate and inclinedly rotate the movable plate about a first link axis after the movable plate is slid;
a second rotary link unit rotatably coupled to the first rotary link unit and rotated about a second link axis when the first rotary link unit is rotated; and
a third rotary link unit coupled to the third housing, rotatably coupled to the first housing and the second rotary link unit, and rotated to introduce or withdraw the third housing into or from the first housing when the second rotary link unit is rotated.

7. The slide-type cradling apparatus according to claim 6, wherein a hinge stopper unit rotatably coupling the first rotary link unit to said known angle, coupled to a stopper pin passing through a stopper hole of the first rotary link unit to support the first rotary link unit and limit rotation of the first rotary link unit.

8. The slide-type cradling apparatus according to claim 7, wherein the hinge stopper unit includes:
a screw coupler screw-coupled to the first housing;
a hinge hole through which a hinge pin passing through a link hinge hole of the first rotary link unit passes such that the first rotary link unit is rotated;
a stopper hole formed adjacent to the hinge hole and through which the stopper pin passes; and at least one click recess formed adjacent to the stopper hole, into and from which a detachable ball formed in the first rotary link unit is attached and detached as the first rotary link unit is rotated.

9. The slide-type cradling apparatus according to claim 8, wherein the first rotary link unit includes:
   a guide mover slidably moving the movable plate;
   a rotary boss formed at one end of the first rotary link unit and rotatably coupled to the second rotary link unit;
   a link hinge hole formed adjacent to the guide mover to provide the first link axis and to which the hinge pin is rotatably coupled; and
   a link stopper hole formed adjacent to the link hinge hole and to which the stopper pin is coupled to limit rotation of the first rotary link unit.

10. The slide-type cradling apparatus according to claim 9, wherein a first link hole rotatably coupled to the rotary boss formed in the first rotary link unit is formed at one end of the second rotary link unit, a link support providing the second link axis and supporting the second rotary link unit such that the second rotary link unit is rotated and balanced about the second link axis, and a second link hole rotatably coupled to a rotary boss formed in the third rotary link unit is rotatably coupled to an opposite end of the second rotary link unit.

11. The slide-type cradling apparatus according to claim 10, wherein the third rotary link unit includes:
   a link rotating boss rotatably coupled to the second link hole of the second rotary link unit; and
   a rotation supporting boss rotatably coupled to the first housing to provide the third link axis and support rotation of the third rotary link unit.

12. A slide mechanism comprising:
   a first sliding device for coupling together in a sliding manner first and second housings of a portable device, and for engaging a stopper unit, the sliding device moving from a first position to a second position with respect to the stopper unit;
   a first hinge device engaging the first sliding device at a first end of the first hinge device, the first hinge device being rotatable about a center point of the first hinge device;
   a first end of a first rotatable link engaging the first hinge device at a second end of the first hinge device, the first rotatable link being rotatable about a second end of the first rotatable link; and
   the stopper unit including an elongated hole through which a bar engages the stopper unit to the first sliding device and first and second detent positions, wherein as the first sliding device moves from the first position to the second position, the first end of the first hinge device is lowered causing the first end of the rotatable link to rise with respect to the second end of the rotatable link.

13. The slide mechanism of claim 12, further comprising:
   a detachable ball engaging the first detent in the first position and the second detent in the second position.

14. The slide mechanism of claim 12, wherein the bar engaging the first slide device and the stopper unit is in a first state of the elongated hole in the first position and is in a second state of the elongated hole in the second position, wherein the second state is lower than the first state.

15. The portable communication device according to claim 1, further comprising:
   a movable plate coupled to the second housing;
   a first rotary link unit provided at one end of the movable plate to slidably couple the movable plate and inclinedly rotate the movable plate about a first link axis after the movable plate is slid;
   a second rotary link unit rotatably coupled to the first rotary link unit and rotated about a second link axis when the first rotary link unit is rotated; and
   a third rotary link unit coupled to the third housing, rotatably coupled to the first housing and the second rotary link unit, and rotated to introduce or withdraw the third housing into or from the first housing when the second rotary link unit is rotated.

16. The slide-type cradling apparatus according to claim 1, wherein the hinge stopper unit includes:
   a screw coupler screw-coupled to the first housing;
   a hinge hole through which a hinge pin passing through a link hinge hole of the first rotary link unit passes such that the first rotary link unit is rotated;
   a stopper hole formed adjacent to the hinge hole and through which the stopper pin passes; and
   at least one click recess formed adjacent to the stopper hole, into and from which a detachable ball formed in the first rotary link unit is attached and detached as the first rotary link unit is rotated.

17. The slide-type cradling apparatus according to claim 8, wherein the first rotary link unit includes:
   a guide mover slidably moving the movable plate;
   a rotary boss formed at one end of the first rotary link unit and rotatably coupled to the second rotary link unit;
   a link hinge hole formed adjacent to the guide mover to provide the first link axis and to which the hinge pin is rotatably coupled; and
   a link stopper hole formed adjacent to the link hinge hole and to which the stopper pin is coupled to limit rotation of the first rotary link unit.

18. The slide-type cradling apparatus according to claim 17, wherein a first link hole rotatably coupled to the rotary boss formed in the first rotary link unit is formed at one end of the second rotary link unit, a link support providing the second link axis and supporting the second rotary link unit such that the second rotary link unit is rotated and balanced about the second link axis, and a second link hole rotatably coupled to a rotary boss formed in the third rotary link unit is rotatably coupled to an opposite end of the second rotary link unit.

19. The slide-type cradling apparatus according to claim 18, wherein the third rotary link unit includes:
   a link rotating boss rotatably coupled to the second link hole of the second rotary link unit; and
   a rotation supporting boss rotatably coupled to the first housing to provide the third link axis and support rotation of the third rotary link unit.

* * * * *

UNITED STATES PATENT AND TRADEMARK OFFICE
CERTIFICATE OF CORRECTION

| | |
|---|---|
| PATENT NO. | : 8,532,723 B2 |
| APPLICATION NO. | : 12/692723 |
| DATED | : September 10, 2013 |
| INVENTOR(S) | : Sung-Ho Ahn et al. |

It is certified that error appears in the above-identified patent and that said Letters Patent is hereby corrected as shown below:

In the Claims
Column 9, Claim 12, Lines 34-35 should read as follows:
--…first and second housings, and for engaging…--

Signed and Sealed this
Eleventh Day of February, 2014

Michelle K. Lee
*Deputy Director of the United States Patent and Trademark Office*